US012689958B2

(12) United States Patent
Sivaraj et al.

(10) Patent No.: US 12,689,958 B2
(45) Date of Patent: Jul. 21, 2026

(54) METHOD AND APPARATUS FOR PROGRAMMABLE AND CUSTOMIZED INTELLIGENCE FOR TRAFFIC STEERING IN 5G NETWORKS USING OPEN RAN ARCHITECTURES

(71) Applicant: Mavenir Systems, Inc., Richardson, TX (US)

(72) Inventors: Rajarajan Sivaraj, Plano, TX (US); Rahul Soundrarajan, Bengaluru (IN); Pankaj Kenjale, Plano, TX (US); Ankith Gujar, Sunnyvale, CA (US); Tarunjeet Singh, New Delhi (IN); Wasi Asghar, Bengaluru (IN)

(73) Assignee: Mavenir Systems, Inc., Richardson, TX (US)

( * ) Notice: Subject to any disclaimer, the term of this patent is extended or adjusted under 35 U.S.C. 154(b) by 405 days.

(21) Appl. No.: 18/191,933

(22) Filed: Mar. 29, 2023

(65) Prior Publication Data

US 2023/0319662 A1     Oct. 5, 2023

(30) Foreign Application Priority Data

Apr. 5, 2022     (IN) .............................. 202221020576

(51) Int. Cl.
*H04W 36/08*          (2009.01)
*H04W 36/00*          (2009.01)
(Continued)

(52) U.S. Cl.
CPC ....... *H04W 36/13* (2023.05); *H04W 36/0085* (2018.08); *H04W 36/22* (2013.01)

(58) Field of Classification Search
CPC ......... H04W 36/13; H04W 36/008375; H04W 36/0085; H04W 36/22
(Continued)

(56) References Cited

U.S. PATENT DOCUMENTS

2021/0012227 A1    1/2021  Fang et al.
2021/0326695 A1    10/2021  Vitebsky et al.
(Continued)

FOREIGN PATENT DOCUMENTS

WO          2021176092 A1      9/2021

OTHER PUBLICATIONS

IP.com search history (Year: 2025).*
(Continued)

*Primary Examiner* — Moustapha Diaby
(74) *Attorney, Agent, or Firm* — Ruggiero McAllister & McMahon LLC

(57)                    ABSTRACT

A method of optimizing traffic steering (TS) radio resource management (RRM) decisions for handover of individual user equipment (UE) in Open Radio Access Network (O-RAN) includes: providing an O-RAN-compliant near real time RAN intelligent controller (near-RT RIC) configured to interact with O-RAN nodes; and utilizing an artificial intelligence (AI)-based TS application xApp in the near-RT RIC to optimize TS handover control and maximize UE throughput utility. The TS xApp is configured utilizing a virtualized and simulated environment for O-RAN, which virtualized and simulated environment for O-RAN is provided by ns-O-RAN platform. The optimization problem to be solved is formulated as a Markov Decision Process (MDP), and a solution to the optimization problem is derived by using at least one reinforcement learning (RL) technique.

18 Claims, 9 Drawing Sheets

(51) Int. Cl.
    *H04W 36/12*       (2009.01)
    *H04W 36/14*       (2009.01)
    *H04W 36/18*       (2009.01)
    *H04W 36/22*       (2009.01)
    *H04W 36/30*       (2009.01)

(58) Field of Classification Search
    USPC ........................................................ 455/436
    See application file for complete search history.

(56)              References Cited

U.S. PATENT DOCUMENTS

2022/0014963 A1   1/2022  Yeh et al.
2022/0159525 A1*  5/2022  Chou ................ H04W 36/0058
2022/0295309 A1*  9/2022  Akhtar .................. H04W 24/02

OTHER PUBLICATIONS

Extended European Search Report for corresponding European application No. 23166443.4; 8 pages, dated Aug. 24, 2023.
3rd Generation Partnership Project (3GPP) TS No. 38.901 . Study on channel model for frequencies from 0.5 to 100 ghz . 3GPP. (Version 16.1.0) Jan. 11, 2020; 3rd Generation Partnership Project, Valbonne, France.
3rd Generation Partnership Project (3GPP) TS No. 37.340. NR; multi-connectivity; overall description; stage-2 (Version 16.8.0); Dec. 23, 2021; 3rd Generation Partnership Project, Valbonne, France.
Abdalla, A. S., Upadhyaya, P. S., Shah, V. K., & Marojevic, V. . "Toward Next Generation Open Radio Access Network-What O-RAN Can and Cannot Do!" arXiv preprint arXiv:2111.13754 [cs.NI]; IEEE Network (Nov. 2022).
Agarwal, R., Schuurmans, D., & Norouzi, M. "An optimistic perspective on offline reinforcement learning" Proceedings of 37th International conference on machine learning (pp. 104-114).(2020).
Balasubramanian, B., et al. . Ric: "A ran intelligent controller platform for ai-enabled cellular networks" IEEE Internet Computing, 25(2), 7-17. doi: 10.1109/MIC.2021.3062487; (2021).
Bonati, L., D'Oro, S., Polese, M., Basagni, S., & Melodia, T. "Intelligence and Learning in O-RAN for Data-driven NextG Cellular Networks" IEEE Communications Magazine, 59(10), 21-27; (Oct. 2021).
Calabrese, F. D., Wang, L., Ghadimi, E., Peters, G., Hanzo, L., & Soldati, P. "Learning radio resource management in rans: Framework, opportunities, and challenges" IEEE Communications Magazine, 56(9), 138-145.(2018).
Challita, U., Ryden, H., & Tullberg, H. "When machine learning meets wireless cellular networks: Deployment, challenges, and applications" IEEE Communications Magazine, 58(6), 12-18.(Jun. 2020).
Chinchali, S., et al. "Cellular network traffic scheduling with deep reinforcement learning" In Proc. of thirty-second AAAI Conf. on Artificial Intelligence (pp. 766-774). New Orleans, LA.(2018).
D'Oro, S., Bonati, L., Polese, M., & Melodia, T. OrchestRAN: Orchestrating Intelligence in the Open RAN. Proceedings of IEEE Infocom; (2022).
Dryjanski, M., Kulacz, L., & Kliks, A. "Toward modular and flexible open RAN implementations in 6g networks: Traffic steering use case and O-RAN xapps" Sensors, 21(24).(2021).
Guo, D., Tang, L., Zhang, X., & Liang, Y. "Joint optimization of handover control and power allocation based on multi- agent deep reinforcement learning" IEEE Transactions on Vehicular Technology, 69(11), 13124-13138.(2020).
Koda, Y., Yamamoto, K., Nishio, T., & Morikura, M. "Reinforcement learning based predictive handover for pedestrian-aware mmwave networks" IEEE conference on computer communications workshops (infocom wkshps) (p. 692-697) (2018).
Kumar, A., Zhou, A., Tucker, G., & Levine, S. "Conservative Q-Learning for Offline Reinforcement Learning."In H. Larochelle, M. Ranzato, R. Hadsell, M. F. Balcan, & H. Lin (Eds.), Advances in neural information processing systems (vol. 33, pp. 1179-1191). Curran Associates, Inc.(2020).
Letaief, K. B., Chen, W., Shi, Y., Zhang, J., & Zhang, Y. A. "The Roadmap to 6G: AI Empowered Wireless Networks" IEEE Communications Magazine, 57(8), 84-90; (Aug. 2019).
Levine, S., Kumar, A., Tucker, G., & Fu, J.. "Offline reinforcement learning: Tutorial, review, and perspectives on open problems" arXiv:2005.01643 [cs.LG]. Retrieved from https://arxiv.org/abs/2005.01643 (2020).
Liu, Q., Kwong, C. F., Wei, S., Li, L., & Zhang, S."Intelligent handover triggering mechanism in 5g ultra-dense networks via clustering-based reinforcement learning" Mobile Networks and Applications, 26(1), 27-39.(2021).
Mezzavilla, M., Zhang, M., Polese, M., Ford, R., Dutta, S., Rangan, S., & Zorzi, M. "End-to-end simulation of 5G mmWave networks" IEEE Communications Surveys Tutorials, 20(3), 2237-2263.(Apr. 2018).
Mnih, V., Kavukcuoglu, K., Silver, D., Graves, A., Antonoglou, I., Wierstra, D., & Riedmiller,M. "Playing atari with deep reinforcement learning." arXiv:1312.5602v1 [cs.LG] Dec. 19, 2013.
Mollahasani, S., Erol-Kantarci, M., & Wilson, R. "Dynamic CU-DU Selection for Resource Allocation in O-RAN Using Actor-Critic Learning" arXiv preprintarXiv:2110.00492 [cs.NI].(Oct. 2021).
Mollel, M. S., et al." Intelligent handover decision scheme using double deep reinforcement learning" Physical Communication, 42, 101133.(2020).
Muñoz, P., Barco, R., & de la Bandera, I. (2015). Load balancing and handover joint optimization in lte networks using fuzzy logic and reinforcement learning. Computer Networks, 76, 112-125.
Mwanje, S., & Mitschele-Thiel, A. "Minimizing handover performance degradation due to lte self organized mobility load balancing." IEEE 77th vehicular technology conference (vtc spring). (2013).
O-RAN Software Community. sim-e2-interface repository. https://github.com/o-ran-sc/sim-e2-interface. (Accessed Mar. 2022).
O-RAN Working Group 1. "Use Cases Detailed Specification 6.0." ORAN.WG1.Use-Cases-Detailed-Specification-v06.00 Technical Specification.(Jul. 2021). O-RAN Alliance, Alfter, Germany.
O-RAN Working Group 3. "Near-Real-time RAN Intelligent Controller E2 Service Model (E2SM) Key Performance Measurement (Kpm)" Oran. WG3.E2SM-KPM-v02.01.(Nov. 2021)O-RAN Alliance, Alfter, Germany.
O-RAN Working Group 3 "Near-Real-time RAN Intelligent Controller E2 Service Model (E2SM) Ran Control (Rc)" O-RAN.WG3. E2SM-RC-v01.01.O-RAN Alliance, (Nov. 2021) Alfter, Germany.
Polese, M., Bonati, L., D'Oro, S., Basagni, S., & Melodia, T. "Understanding O-RAN: Architecture, Interfaces, Algorithms, Security, and Research Challenges." arXiv:2202.01032 [cs.NI]. Retrieved from https://arxiv.org/ abs/2202.01032; (Feb. 2022).
Polese, M., Giordani, M., Mezzavilla, M., Rangan, S., & Zorzi, M. "Improved handover through dual connectivity in 5g mmwave mobile networks." IEEE Journal on Selected Areas in Communications, 35(9), 2069-2084.(2017).
Sana, M., De Domenico, A., Strinati, E., & Clemente, A. "Multi-agent deep reinforcement learning for distributed handover management in dense mmwave networks" IEEE international conference on acoustics, speech and signal processing (icassp) (p. 8976-8980).(2020).
Sivaraj, R., Larson, B., Soundrarajan, R., Asghar, W., & Kenjale, P. "Building the world's first o-ran-compliant, ai-powered, closed-loop near-rt ric." Retrieved from https://www.mavenir.com/blog/building-the-worlds-first-o-ran-compliant-ai-powered-closed-loop-near-rt-ric/ (Feb. 2022).
Tayyab, M., Gelabert, X., & Jantti, R. "A survey on handover management: From LTE to NR" tIEEE Access, 7, 118907-118930. (2019).
Wang, S., Liu, H., Gomes, P., & Krishnamachari, B. "Deep reinforcement learning for dynamic multichannel access in wireless networks." IEEE Trans. Cogn. Commun. Netw., 4(2), 257-265. doi: 10.1109/TCCN.2018.2809722; (Jun. 2018).

(56)          References Cited

OTHER PUBLICATIONS

Wang, Z., Li, L., Xu, Y., Tian, H., & Cui, S. "Handover control in wireless systems via asynchronous multiuser deep reinforcement learning." IEEE Internet Things J., 5(6), 4296-4307.(Dec. 2018).
Yajnanarayana, V., Rydén, H., & Hevizi, L. "5g handover using reinforcement learning" IEEE 3rd 5G world forum (5gwf) (p. 349-354).(2020).

* cited by examiner

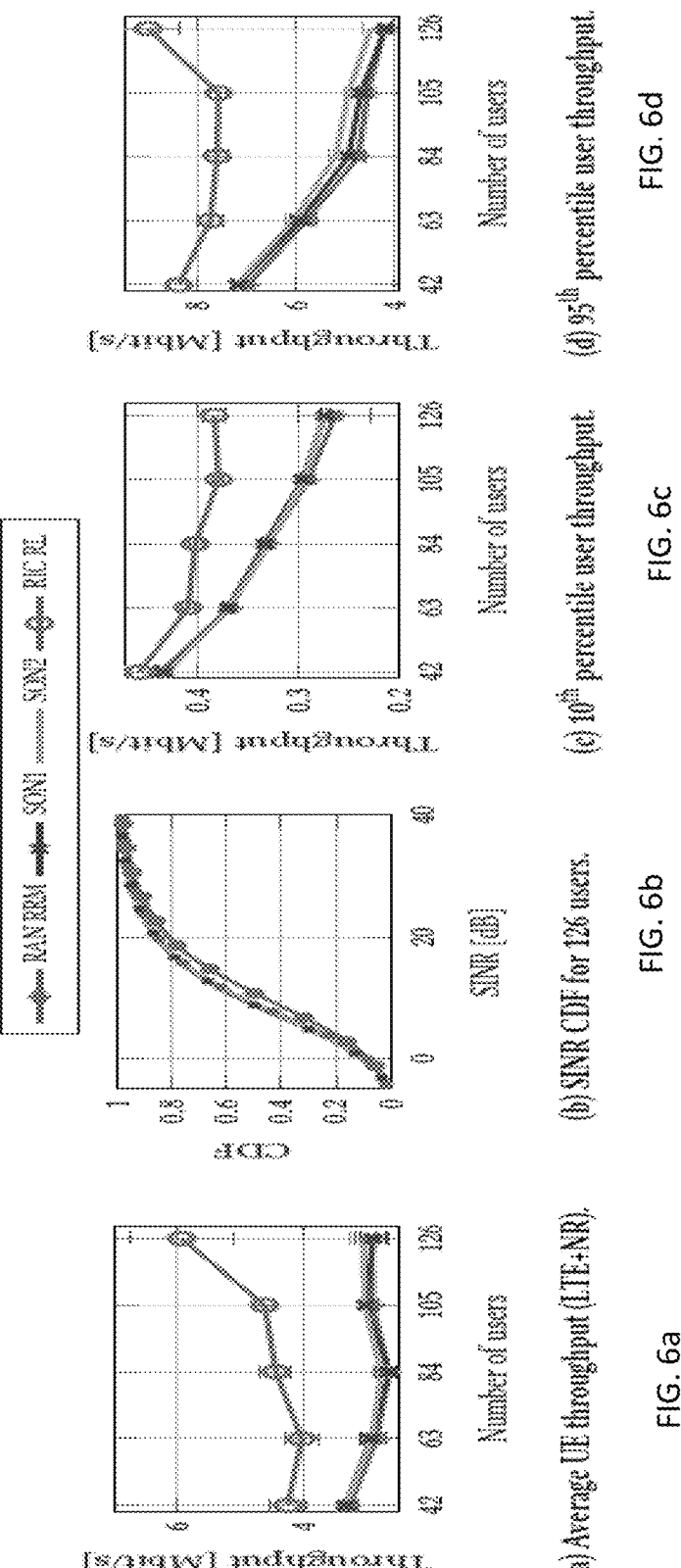
(a) Average UE throughput (LTE+NR).    FIG. 6a
(b) SINR CDF for 126 users.    FIG. 6b
(c) 10th percentile user throughput.    FIG. 6c
(d) 95th percentile user throughput.    FIG. 6d 7001　7002　7003　7004　7005　7006　7007　7008　7009　7010

(a) Average spectral efficiency, per UE.　(b) Average spectral efficiency, per cell.　(c) Average number of PRB used in down-link, per cell, percentage.　(d) UE mobility overhead $H_a$.

METHOD AND APPARATUS FOR PROGRAMMABLE AND CUSTOMIZED INTELLIGENCE FOR TRAFFIC STEERING IN 5G NETWORKS USING OPEN RAN ARCHITECTURES

BACKGROUND OF THE INVENTION

The present disclosure relates to Radio Access Network (RAN) for 5G and 6G-based mobile networks, and relates more particularly to traffic steering (TS) in 5G and 6G networks using Open Radio Access Network (O-RAN).

5G and future (e.g., 6G) cellular (mobile) networks will need to support a wide set of heterogeneous use cases at an unprecedented scale, calling for automated control and optimization of network functionalities, customized to individual users. However, such fine-grained control of the Radio Access Network (RAN) functionalities is not possible with traditional cellular architectures. Therefore, 5G and 6G cellular networks will need to provide improved wireless communications and networking capabilities to enable heterogeneous use cases such as Ultra Reliable and Low Latency Communications (URLLC), Enhanced Mobile Broadband (eMBB), and massive machine-type communications, ranging from industrial Internet of Things (IoT) to metaverse, telepresence and remote telesurgery.

The O-RAN paradigm and its specification put forward by the O-RAN Alliance introduce "open" cellular architectures based on abstractions enabling closed-loop control providing data-driven, autonomous, and intelligent optimization of the RAN at user-level. This is obtained through custom RAN control applications, i.e., xApps, a software tool used to manage network functions in near-real time by a near-real-time RAN Intelligent Controller (Near-RT RIC) at the edge of the network.

Because the use-case requirements and deployment scenarios keep changing with evolving radio access technologies (RAT), this has prompted research, development, and standardization efforts in newer Radio Access Network (RAN) architectures that have resulted in the Open RAN (O-RAN) paradigm. Standardized by the O-RAN Alliance and established on the foundations of software-defined networking and network function virtualization, the O-RAN architecture is based on the following principles:

Openness: The interfaces between different RAN functional nodes in O-RAN are open interfaces for multi-vendor inter-operability.

Virtualization: The network functions are migrated from vendor-proprietary nodes to virtualized loads on white-box hardware.

Intelligence: The RAN is open to Radio Resource Management (RRM) through third-party applications deployed in centralized RAN Intelligent Controllers (RICs). The RICs host applications performing closed-loop control of the RAN over open interfaces, leveraging advanced data-driven Artificial Intelligence (AI) and Machine Learning (ML) techniques to efficiently learn complex cross-layer interactions across nodes and optimize RRM decisions, which cross-layer interactions are not captured by traditional RRM heuristics.

Programmability: The network is programmatically configured and adapted with AI/ML-driven policies, based on continuous monitoring of network and User Equipment (UE) performance.

As discussed above, intelligence is crucial in O-RAN. The RIC leverages intelligence for making RRM decisions for RAN functions at UE-level and exercising them via closed-loop control. Specifically, the near-Real-Time (RT) RIC can control the RAN base stations with loops running between 10 ms and 1 s through the E2 interface. The near-RT RICs can onboard custom logic through xApps to integrate AI/ML algorithms for RAN control.

Among others, O-RAN use cases include the optimization of traffic steering (TS), where intelligent controllers are used to enforce optimal handover policies based on multiple performance metrics. The TS RAN functionality is responsible for the mobility management of individual UEs served by the RAN. TS manages key RAN procedures, such as handover management, dual connectivity, and carrier aggregation, among others. While handover management is a classic problem, the requirements and deployment scenarios for optimizing handovers keep changing with evolving radio access technologies and use-cases, posing newer challenges and requiring newer optimization strategies. As an example, the handover optimization requirements for eMBB UEs are different from those of URLLC UEs. Similarly, traditional RRM solutions, largely based on heuristics only involving channel quality and load thresholds, are not primed to handle UE-centric handover decisions for new use-cases, and are often based on local, and thus limited, information.

The handover problem has been widely studied in the wireless field. Without O-RAN, the solutions for the handover problem are implemented by using different approaches. Generally, it is common practice to perform the handover based on channel-quality hysteresis, and/or to advance handovers from overloaded to less loaded ones for load balancing. More recent approaches exploit RL to select the target node for the handover. There are several examples of AI-based handover procedures. One of the possible approaches is represented by the use of a centralized RL agent with handover-control using Q-learning and subtractive clustering techniques to optimize the UE's mobility. Other techniques consider distributed Q-Learning approaches or cooperative multi-agents to optimize the handover process on Self-Organizing Networks (SONs). Another area of interest is represented by the use of the Deep Neural Network (DNN) in both the online training mode on the UEs or via offline schemes. One known technique uses DNN with supervised learning to transfer knowledge based on traditional handover mechanisms and avoid negative effects of random exploration for an untrained agent. Other example techniques propose a unified self-management mechanism based on fuzzy logic and RL to tune handover parameters of the adjacent cells. Additional example techniques generally optimize the performance of an individual UE and do not fully satisfy the need for per-UE control and optimization. None of the known techniques proposes approaches that can be practically applied in O-RAN and 3GPP networks.

Therefore, there is a need for a solution that optimizes traffic steering (TS) radio resource management (RRM) decisions for handover of individual UEs, which solution is compliant with the O-RAN standards.

SUMMARY OF THE INVENTION

According to an example embodiment of the present disclosure, a user-level TS intelligent handover method that is compliant with the O-RAN standards and based on Deep Reinforcement Learning (DRL) is provided.

According to an example embodiment of the present disclosure, an O-RAN standard-compliant Near-RT RIC platform is provided with O-RAN-defined open interfaces and service models, i.e., standardized mechanisms to interact with RAN nodes.

According to an example embodiment of the present disclosure, a data-driven AI-powered TS xApp in the near-RT RIC is utilized to maximize the UE throughput utility through handover control, e.g., ns-O-RAN is used to develop the TS xApp.

According to an example embodiment of the present disclosure, the optimization problem to be solved is formulated as a Markov Decision Process (MDP), and the problem solution is derived by using RL techniques.

According to an example embodiment of the present disclosure, a Traffic Steering (TS) xApp based on Deep Reinforcement Learning (DRL) is provided to optimally control the mobility management for individual UEs using the RIC. Data-driven solutions at the RIC leverage a centralized point of view and AI/ML to learn complex interdependencies between RAN parameters and target the optimization to the Quality of Service (QoS) requirements of each UE.

According to an example embodiment of the present disclosure, advanced Reinforcement Learning (RL) methods are utilized for the TS use case to select the optimal target cells for handover of individual UEs.

According to an example embodiment of the present disclosure, the DRL is based (i) on the Conservative Q-learning (CQL) and Random Ensemble Mixture (REM) variants of a Deep Q-Network (DQN) algorithm, and (ii) on a state-of-the-art Convolutional Neural Network (CNN) architecture.

According to an example embodiment of the present disclosure, CQL and REM are used to model the Q-function and the loss function, along with the CNN architecture to maximize the expected re-ward.

According to an example embodiment of the present disclosure, the DRL-based solution enables multi-UE control with a multi-dimensional state space using a single RL agent.

According to an example embodiment of the present disclosure, a system including a Near-RT RIC with a service-based architecture and a TS xApp is provided, which system is integrated with a 3GPP-based simulated environment on ns-3 (which is a discrete-event network simulator, e.g., for simulation of a 5G cellular network such as an O-RAN compliant network) for large scale data collection and testing of DRL-driven control policies.

According to an example embodiment of the present disclosure, the TS xApp deployed in the example near-RT RIC platform is evaluated for Key Performance Indicators (KPIs), e.g., UE throughput, spectral efficiency, and mobility overhead on a large-scale RAN network created by ns-O-RAN platform (a virtualized and simulated environment for O-RAN).

According to an example embodiment of the present disclosure, ns-O-RAN, which bridges large scale 5G simulations in the open-source Network Simulator 3 (ns-3) with a real-world O-RAN Near-RT RIC, is utilized to combine the scale and flexibility of a simulated RAN with a real-world near-RT RIC.

According to an example embodiment of the present disclosure, ns-3 5G RAN module is extended by adding an O-RAN compliant E2 implementation to arrive at the ns-O-RAN, which enables the RAN to stream events and data to the near-RT RIC, and the RIC to send control actions to the RAN over E2 with O-RAN compliance. In this manner, ns-O-RAN enables xApps development without relying on RAN baseband and radio units, and the same xApps can be subsequently tested on a real RAN, without additional development effort.

According to an example embodiment of the present disclosure, the above-described system is designed, trained, and tested on a large scale deployment up to 126 users with 8 base stations, using more than 40 million data points for the DRL training. The results show that the xApp-based handover improves throughput and spectral efficiency by an average of 50% over traditional handover heuristics, with a comparable mobility overhead.

BRIEF DESCRIPTION OF THE DRAWINGS

FIG. 6a shows the average UE throughput for the 850 MHz deployment.

FIG. 6b illustrates the Cumulative Distribution Function (CDF) of the SINR with 126 UEs.

FIG. 6c illustrates the user throughput for $10^{th}$ percentile users.

FIG. 6d illustrates the user throughput for $95^{th}$ percentile users.

DETAILED DESCRIPTION OF THE INVENTION

Before describing the example embodiments, an overview of the relevant technology framework will be presented, i.e., O-RAN cellular architecture, AI/ML in RIC, dual connectivity and traffic steering.

Figure 1:
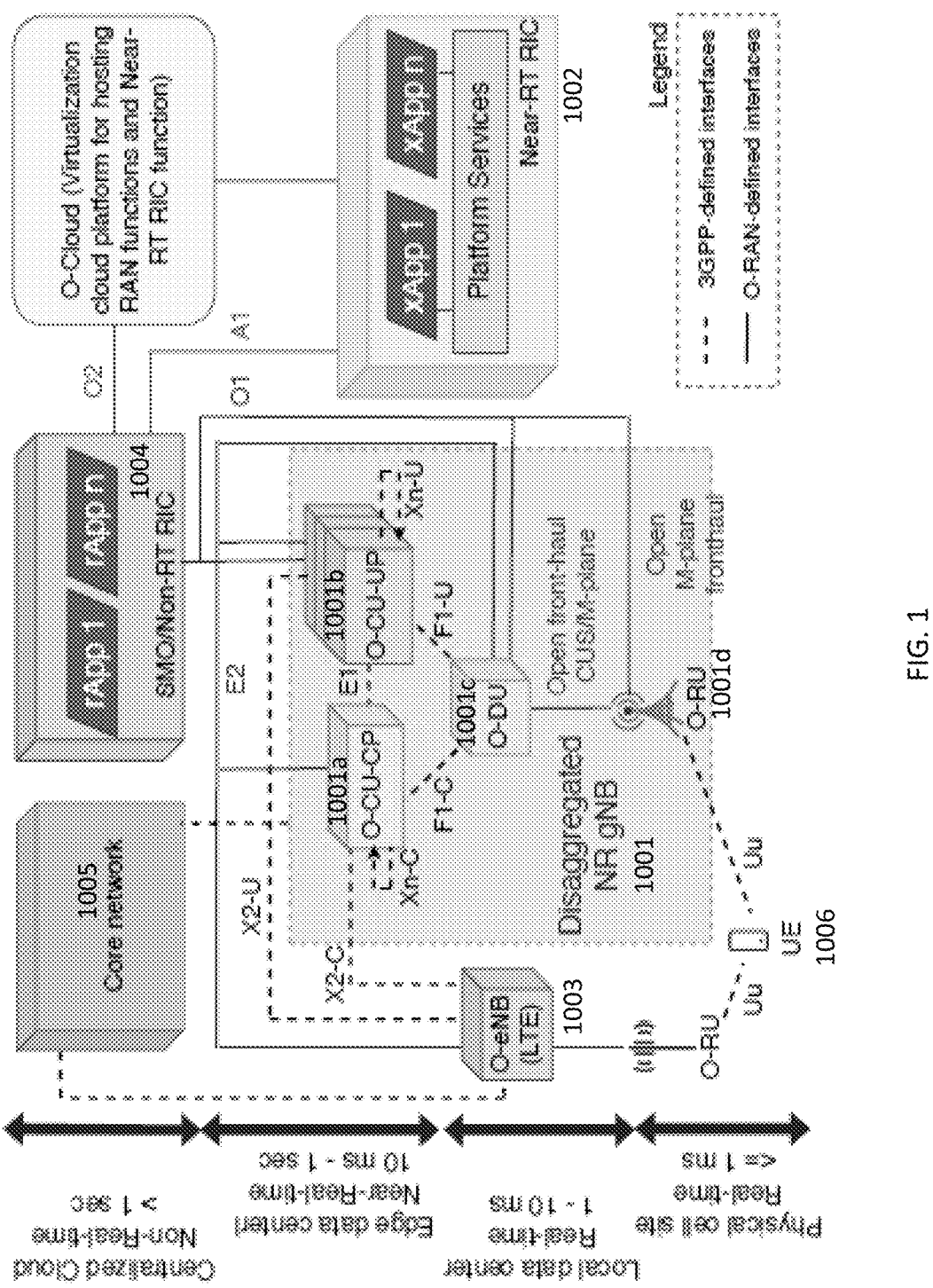
FIG. 1 illustrates an overview of the architecture including RAN protocol stack.

O-RAN Cellular Architecture is described in connection with FIG. 1, which illustrates an overview of the architecture including RAN protocol stack. Shown in FIG. 1 is a baseband unit of the NR base station, also called the Next Generation Node Base (gNB) 1001, which is logically split into RAN functional nodes, e.g., O-RAN Centralized Unit-Control Plane (O-CU-CP) 1001a, O-RAN Centralized Unit-User Plane (O-CU-UP) 1001b, O-RAN Distributed Unit (O-DU) 1001c, and O-RAN Radio Unit(s) (O-RU) 1001d. These functional nodes are connected through standardized O-RAN and 3GPP-defined interfaces. In an example embodiment, the O-CU-CP 1001a can i) feature the Radio Resource Control (RRC) and Packet Data Convergence Protocol-Control Plane (PDCP-C) layers, and ii) manage the connectivity and mobility for the UEs. The O-CU-UP 1001b can handle the Service Data Adaptation Protocol (SDAP)

and Packet Data Convergence Protocol-User Plane (PDCP-U) layers, dealing with Data Radio Bearers (DRBs) that carry user traffic. The O-DU 1001c features the Radio Link Control (RLC), Medium Access Control (MAC) and Upper Physical (PHY-U) layers, for buffer management, radio resource allocation, and physical layer functionalities, such as operating the NR cells. For LTE, all its layers are managed in a single function, the O-RAN evolved Node Base (O-eNB), and it operates the LTE cells. Finally, the O-RU 1001d is responsible for Lower Physical (PHY-L) layer, dealing with transmission and beamforming.

Also shown in FIG. 1 is the near-real-time (near-RT) RIC 1002, which is typically deployed in a virtualized cloud platform at the edge of the RAN. Near-RT RIC 1002 onboards extensible applications (xApps), apart from O-RAN standardized platform framework functions (denoted as "platform services" in FIG. 1), to optimize RRM decisions for dedicated RAN functionalities using low-latency control loops at near-RT granularity (e.g., 10 ms-1 sec). The Near-RT RIC 1002 can connect through the E2 interface to the O-CU-CP 1001a, O-CU-UP 1001b, O-DU 1001c and O-eNB 1003, collectively referred to as the E2 nodes. The E2 interface is a bi-directional interface that splits the RRM between the E2 nodes and the near-RT RIC 1002. With this architecture, the call processing and signaling procedures are implemented in the E2 nodes, but the RRM decisions for these procedures are controlled by the RIC through xApps. For example, the handover procedures for a UE are processed by the E2 node, but the UE's target cell for handover is decided and controlled by the RIC.

The procedures and messages exchanged over the E2 interface are standardized by E2 Application Protocol (E2AP). Using E2AP, the E2 nodes can send reports (e.g., with RAN data or UE context information) to the near-RT RIC 1002. In addition, the near-RT RIC 1002 can send control actions (e.g., containing RRM decisions), policies, and subscriptions to the E2 node. The xApps (e.g., xApp 1 and xApp n in FIG. 1) in the near-RT RIC 1002 encode and decode the payload of the E2AP messages containing RRM-specific information, as defined by the E2 Service Models (E2SMs). The service models define the information model and semantics of RRM operations over E2. Two E2SMs of interest in the present disclosure can be E2SM-Key Performance Measurement (KPM), which allows E2 nodes to send RAN performance data to the RIC, with granularity down to the UE-level, and E2SM-RAN Control (RC), which allows the RIC to send back control based on RRM decisions from xApps.

The Near-RT RIC 1002 connects to the Non-RT RIC 1004, which is responsible for setting high-level RRM objectives, over the AI interface. The Non-RT RIC 1004 is deployed in a centralized Service Management and Orchestration (SMO) engine that does Fault, Configuration, Accounting, Performance and Security (FCAPS) management and infrastructure orchestration (which functionalities are represented by rApp applications rApp 1 and rApp n) for the E2 nodes, O-RU 1001d and Near-RT RIC 1002 through O1 and O2 interfaces, respectively, as shown in FIG. 1. Also shown in FIG. 1 are UE 1006 and the interfaces among the O-CU-CP 1001a, O-CU-UP 1001b, O-eNB 1003 and the packet core network 1005.

AI/ML in RIC will be described in this section. O-RAN Alliance has defined specifications for life cycle management of ML-driven RAN control from RIC. Considered in an example embodiment are ML models trained offline and deployed as xApps for online inference and RRM control in the RIC. In an example embodiment, we consider reinforcement learning (RL), which teaches an agent how to choose an action from its action space, within a particular environment, to maximize rewards over time. The goal of the RL agent is then to compute a policy, which is a mapping between the environment states and actions so as to maximize a long term reward. RL problems are of particular interest to RIC, since these problems are closed-loop in nature. The RL agent autonomously interacts with the environment for the purpose of taking control actions, and these actions influence subsequent inputs to the agent.

According to an example embodiment, the RL model of interest is Deep Q-Network (DQN), which is a model-free, off-policy, value-based RL. "Model-free" means that the RL algorithm does not model the state transition probability in the environment due to actions, but estimates the reward from state-action samples for the purpose of taking subsequent actions. In off-policy RL algorithms, the target policy, which is the policy that the RL agent is learning to iteratively improve its reward value function, is different from the behavior policy, which is the policy used by the RL agent to generate action towards interacting with the environment. An example embodiment of the RL algorithm uses a Q-value that measures the expected reward for taking a particular action at a given state. DQN can be i) trained offline, and ii) its policy can be continually updated online, and iii) subsequently deployed in the inference host for the purpose of generating optimal actions, as the agent receives live data streams from the environment.

In this section, dual connectivity and traffic steering will be discussed. Dual connectivity is a mode of 5G RAN deployment in which the UE is jointly connected to more than one base station (e.g., O-eNB/gNB). One of the base stations is designated as the master node (solely responsible for control plane procedures of a UE), and the other base station is the secondary node (jointly responsible for data transfer for the UE along with the master node). A prevalent 5G deployment in North America (and globally) is E-UTRAN-NR Dual Connectivity (EN-DC) Non-Stand-Alone (NSA) mode 3X, where the LTE O-eNB is the master node, and NR gNB is the secondary node.

Traffic steering (TS) is a RAN functionality (handled by the RRC layer) for managing connectivity and mobility decisions of UEs in the RAN. More specifically, TS handles the following, on a UE basis: (i) Primary Cell (PCell) selection and handover, (ii) selection and change of master and secondary nodes for dual connectivity, (iii) selection and handover of Primary cell of the Secondary Node (PSCell).

In the present disclosure, an O-RAN compliant near-RT RIC is implemented, which uses xApps with standard-compliant service models that can be deployed on a real network. In addition, the present disclosure provides a method to test the performance of the xApp combining the real-world RIC with a large scale RAN deployment based on end-to-end, full-stack, 3GPP-based simulations in ns-3. In the following sections, the following are presented for the example embodiments: the system model assumption, the near-RT RIC software architecture, and the ns-O-RAN design.

Figure 2A:
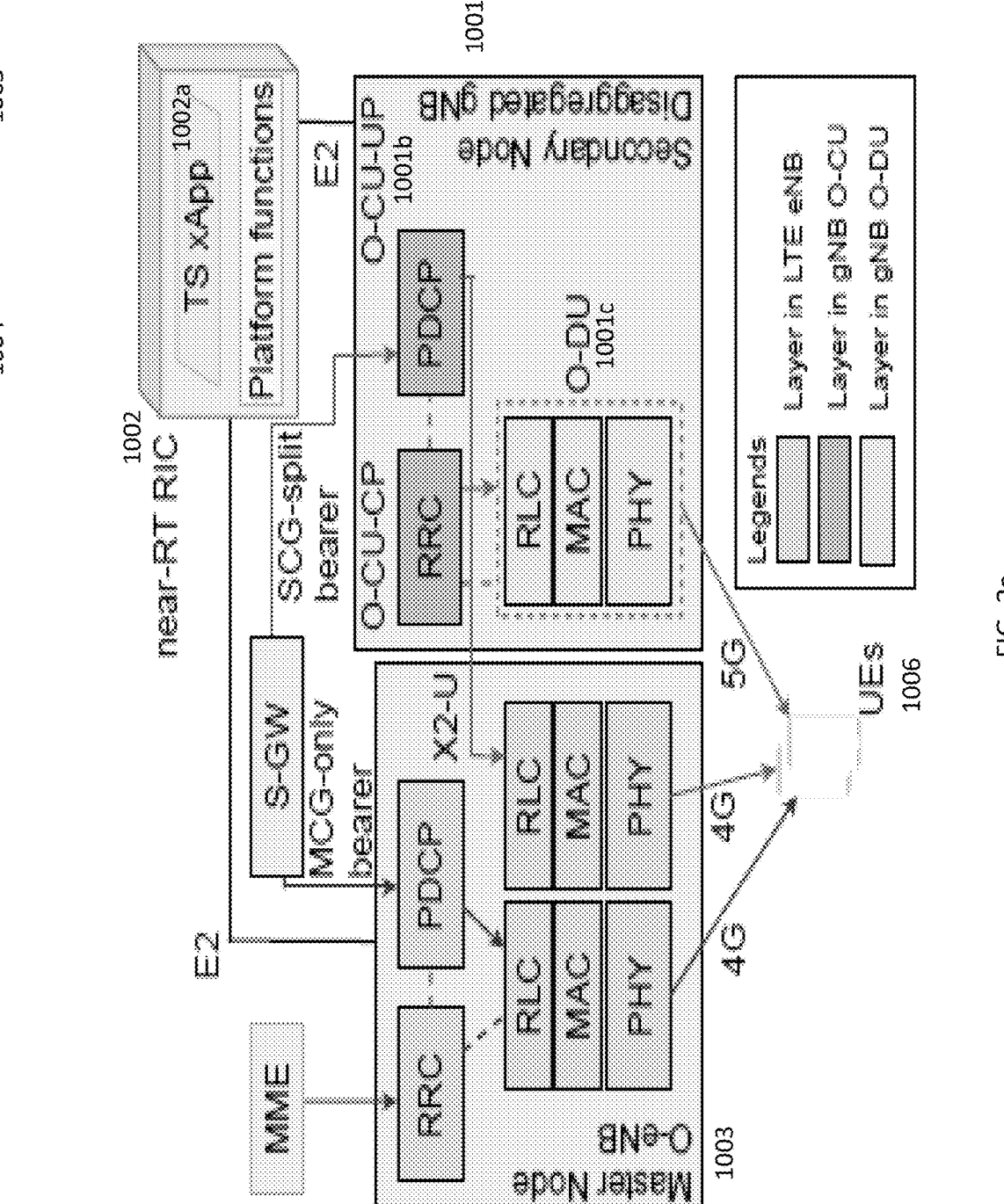
FIG. 2a illustrates the system architecture of an example network according to the present disclosure.

FIG. 2a illustrates the system architecture of an example network, which can include M LTE O-RAN compliant evolved node B (O-eNB) 1003 with M' LTE cells, and E2 nodes of N next generation node B (gNB) 1001 with N' 5G New Radio (NR) cells, and a set U of 5G user equipments (UEs) 1006. The infrastructure is deployed as a 5G Non-Stand Alone (NSA) network with Evolved Universal Mobile Telecommunications System Terrestrial Radio Access NR Dual Connectivity (EN-DC) RAN and option 3X for dual connectivity. With this, a 5G UE 1006 is jointly connected to an LTE O-eNB 1003 (master node) and the E2 nodes of a 5G gNB 1001 (secondary node). Each UE 1006 is jointly served by the primary cell (PCell) of its master node and the primary and secondary cells (PSCell) of its secondary node in EN-DC. The UE(s) 1006 subscribe to heterogeneous types of data traffic (as will be described in detail below). In the RAN, each UE-subscribed data traffic flow (or data radio bearer (DRB), in 3GPP terminology) is split at the PDCP-U layer of the gNB O-CU-UP 1001*b*. Each packet is sent to the lower RLC layer at either the gNB O-DU 1001*c* (over F1 interface) or the LTE O-eNB 1003 over the X2-U interface for subsequent transmission to the UE 1006 via the NR or LTE radio, respectively.

Also shown in FIG. 2*a* is a near-RT RIC 1002 connected to each LTE and NR E2 node through the E2 interface. The near-RT RIC 1002 is deployed at the edge of the RAN and features a TS xApp 1002*a* to optimize UE handover. E2SM-KPM service model is used to stream UE-, cell- and node-level KPM reports from the E2 nodes (discussed in further detail below) to the near-RT RIC 1002 at near-RT period-icities. E2SM-RC service model is used to generate control actions from the near-RT RIC 1002 to the E2 node for handover of specific UE(s) 1006 from their current serving cells to the target cells identified by the TS xApp 1002*a*. Additionally, E2SM-RC is used to report UE-specific L3 RRC measurements (such as Reference Signal Received Power (RSRP), or Signal to Interference plus Noise Ratio (SINR) with respect to its serving and neighbor cells) from the E2 node to the near-RT RIC 1002 periodically and during mobility events.

Figure 2B:
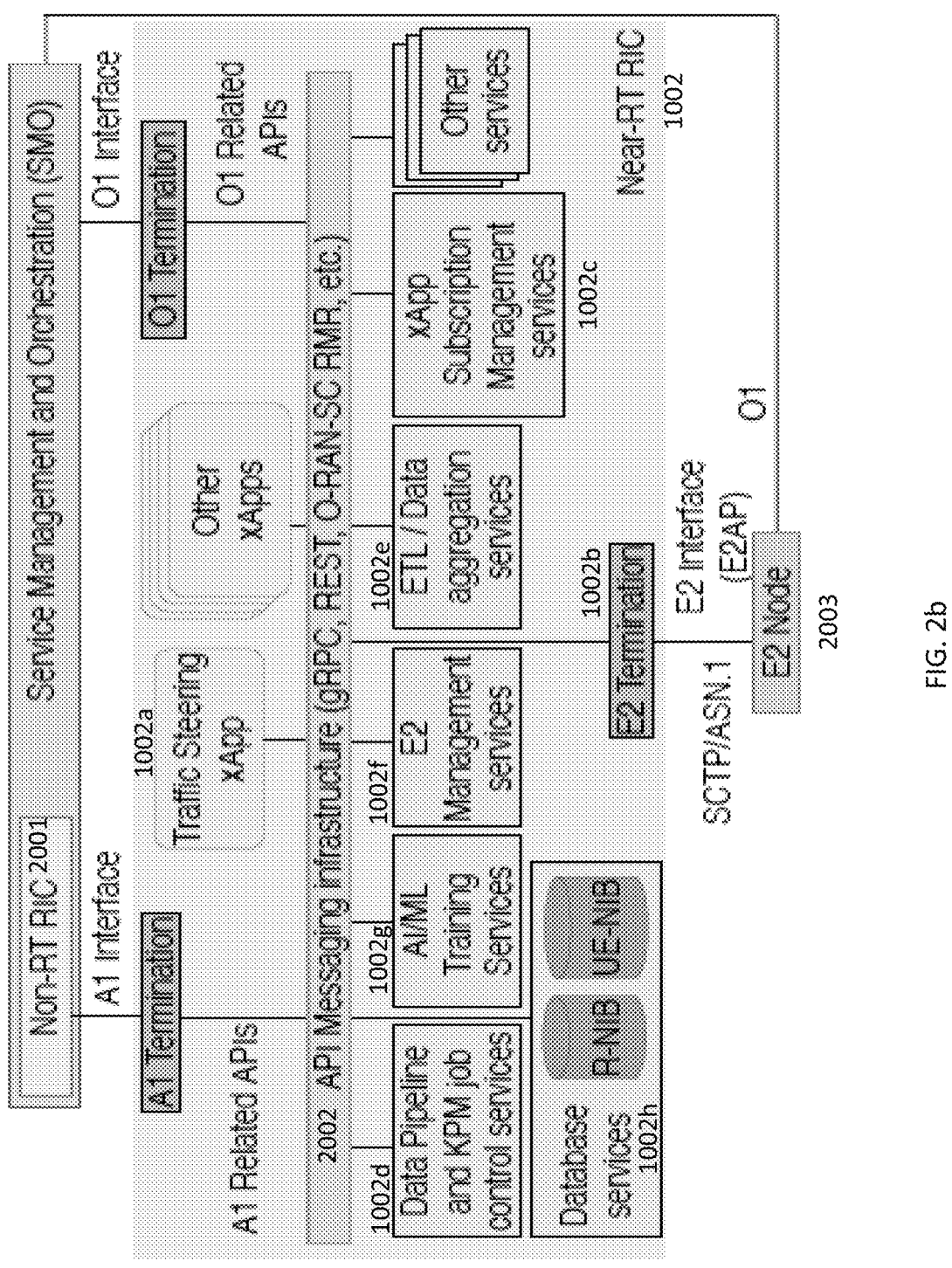
FIG. 2b is a diagram illustrating an example embodiment of the near-RT RIC according to the present disclosure.

The Near-RT RIC software architecture is described in this section. The near-RT RIC in the example embodiment can be implemented with a cloud-native architecture having containerized micro-services that can be deployed on Kuber-nets. The architecture diagram for the example near-RT RIC 1002 presented in this disclosure is shown in FIG. 2*b*. The near-RT RIC 1002 has two sets of applications, namely the xApps (e.g., TS xApp 1002*a* and other xApps, for the control of the RRM of dedicated RAN functionalities) and O-RAN-standardized platform services. The O-RAN-stan-dardized platform services manage integration of xApps, interfacing with E2 nodes, and the overall functioning of the RIC. In particular, the O-RAN-standardized platform ser-vices include the E2 Termination service 1002*b*, which routes the E2AP messages between the platform services and the E2 nodes. The E2 Termination service 1002*b* also performs ASN.1 encoding/decoding, Stream Control Trans-mission Protocol (SCTP), and manages data exposed by E2 node(s) 2003. The xApp Subscription Management service 1002*c* maintains, manages, validates, and sends/receives xApp subscriptions toward E2 nodes. The data collection and aggregation for the xApps is managed by two additional platform services. The Data Pipeline and KPM job control services 1002*d* ensure that xApps do not duplicate KPM requests to the RAN by interacting with the xApps Sub-scription Management services 1002*c* and filtering dupli-cated subscription requests on behalf of the xApps. The KPM data received by the RAN is aggregated, processed, and presented to the xApps by the Extract, Transform and Load (ETL), data aggregation (and ingestion) service 1002*e*. Also shown in FIG. 2*b* are E2 Management services 1002*f*, AI/ML Training services 1002*g*, Database services 1002*h*, Non-RT RIC 2001 provided in SMO, and API Messaging infrastructure 2002 (which can include, e.g., grpc remote procedure call (gRPC) APIs, Representational State Transfer (REST) APIs, and O-RAN Software Community RIC Mes-sage Router (O-RAN-SC RMR) API).

In the example embodiment shown in FIG. 2*b*, the TS xApp 1002*a* leverages the services of the RIC platform through gRPC APIs contained in API Messaging Infrastruc-ture 2002 to (i) collect KPMs on the status of the network; (ii) process them and perform online inference derivation to decide if one or more UEs should perform a handover to a different cell; and, eventually, (iii) send the handover control action to the RAN. The TS xApp 1002*a* triggers an E2 node KPM subscription specifying the parameters for the data collection, i.e., the list of KPMs and serving-cell and neigh-bor-cell L3 RRC measurements, and the periodicity at which these values need to be reported by the E2 nodes. The TS xApp 1002*a* and the simulated RAN implemented with ns-O-RAN (described in further detail below) collectively support streaming 40 UE-level, cell-level, and node-level KPMs from E2 node(s) 2003.

The E2 node 2003 accepts the subscription and starts streaming KPMs and L3 RRC measurements. The raw streamed KPM data is stored by Data Pipeline and KPM job control service 1002*d*. The ETL, data aggregation (and ingestion) services 1002*e* can retrieve relevant measure-ments stored in this data repository, and correlate and aggregate in time series the UE level KPM information and L3 RRC measurements. The TS xApp 1002*a* can then fetch and process the data to perform inference derivation (e.g., using the algorithm described below in further detail). If a handover needs to be performed, the TS xApp 1002*a* communicates with the E2 termination service 1002*b* to send the control action to the RAN.

O-RAN integration in ns-3 is described in this section. In the example embodiment, ns-O-RAN, an O-RAN integra-tion tool for ns-3 simulations, is used to evaluate the example system and the method according to the present disclosure. ns-O-RAN connects a real-world near-RT RIC with ns-3, enabling large scale (i) collection of RAN KPMs, and (ii) testing of closed-loop control of simulated cellular networks. Thanks to the flexibility of ns-3, such integration eases the design, development, and testing of xApps across different RAN setups with no infrastructure deployment cost. ns-3, which provides realistic modeling capabilities for large-scale wireless scenarios, features a channel model with propagation and fading compliant with 3GPP specifications, and a full-stack 5G model for EN-DC RAN, in addition to the TCP/IP stack, multiple applications, and mobility mod-els.

ns-O-RAN bridges ns-3 to the real-world, O-RAN-com-pliant RIC to enable production code (i.e., code that can be used in real-world networks) to be developed and tested against simulated RANs. To do so, we connect the E2 termination 3002 of the real-world near-RT RIC 1002 to a set of E2 endpoints 3003 (net device) in ns-3, which are responsible for handling all the E2 messages to and from the simulated environment. This connection was implemented by extending the E2 simulator, namely e2sim 3004, and incorporating it into a simulator module 3001 for ns-3, which can decode, digest, and provide feedback for all the messages coming from the near-RT RIC 1002, and enables streaming RAN telemetry based on simulation data to the near-RT RIC 1002.

Figure 3:
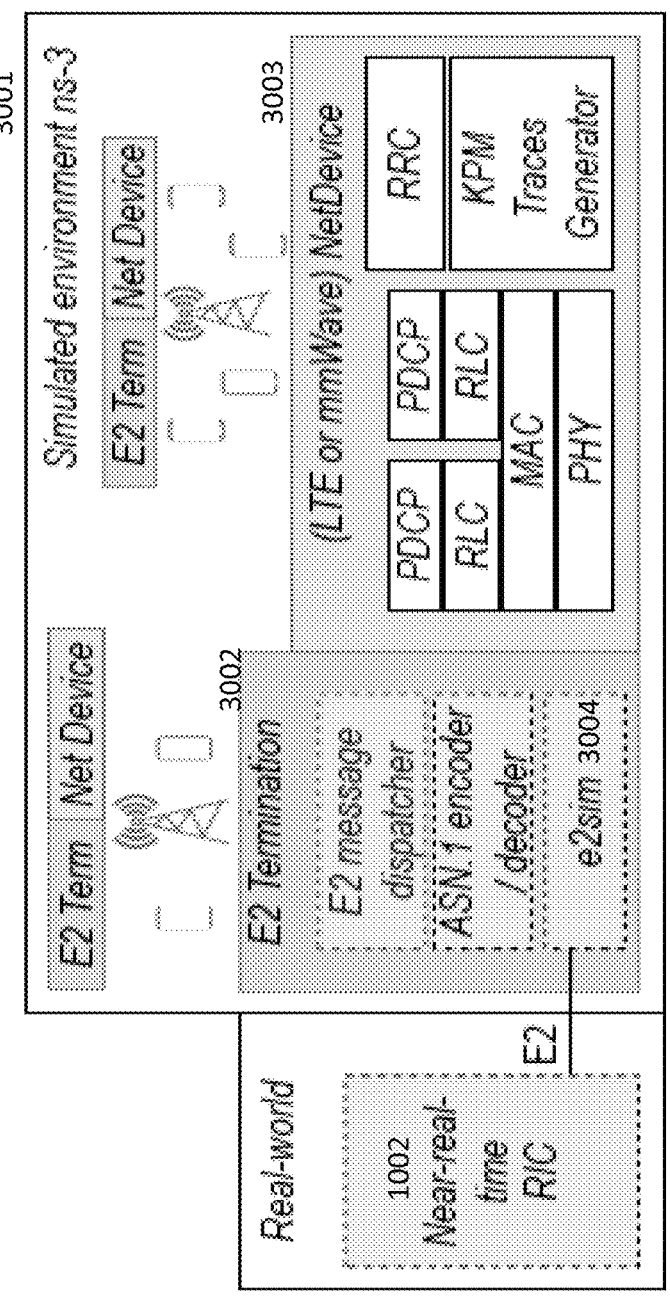
FIG. 3 is a diagram illustrating an example embodiment of the ns-O-RAN architecture according to the present disclosure.

The design of ns-O-RAN addresses several challenges that would otherwise prevent communications between the simulated and real-world environments. As previously dis-cussed above, the near-RT RIC 1002 expects to interface with a number of disaggregated and distinct endpoints, i.e., multiple O-DUs, O-CU-CPs and/or O-CU-UPs, which are usually identified by different IP addresses and/or ports. Instead, all the ns-3 simulated RAN functions (e.g., net devices 3003) are handled by a single process. e2sim itself was not designed to handle multiple hosts at once, while the E2 protocol specifications, which rely on the Stream Control Transmission Protocol (SCTP) for communication over E2 interface (E2AP), do not pose any limitation in this sense. To address this, we extended the e2sim library to support multiple endpoints at the same time and created independent entities (i.e., C++ objects) in the simulated environment to represent different RAN-side E2 terminations 3002. Each RAN function is bound to just one E2 interface, as depicted in FIG. 3 illustrating an example embodiment of the ns-O-RAN architecture according to the present disclosure, and has its own socket address. ns-O-RAN can successfully establish connectivity between multiple RAN nodes (e.g., net devices 3003) and the near-RT RIC 1002 even if a single IP address is associated with the simulation process, as it can filter E2AP messages through unique ports. Moreover, we extended ns-3 to instantiate independent threads for each E2 termination and use callbacks that can be triggered when data is received or transmitted over E2.

Finally, there is also a gap in timing between the real-world near-RT RIC 1002 and the simulator module 3001 for ns-3, which is a discrete-event framework that can execute faster or slower than the wall clock time. This may potentially lead to inconsistencies between the ns-3 simulated environment and the near-RT RIC 1002 which is expecting the real-world timing. To synchronize the two systems, at the beginning of the simulation ns-3 stores the current Unix time in milliseconds and uses it as baseline timestamp. Whenever an E2 message is sent to the near-RT RIC 1002, the simulator module 3001 for ns-3 will sum the simulation time elapsed and the baseline timestamp, ensuring consistency on both sides of the happened-before relationship.

Set forth In this section are the optimization problem for the traffic steering xApp and the method to determine the optimal target cells for handover of UEs. We consider as objective function the weighted cumulative sum of the logarithmic throughput of all the UEs across time, as a function of their instantaneous target PSCell. The optimization goal is to maximize the objective function by optimizing the choice of the target PSCells for all UEs. At the same time, it is desired to avoid frequent handovers for individual UEs, since the handovers increase the network overhead and decrease the network performance. Thus, we associate a cost function for every UE-specific handover and model it as an exponential decay function of the linear difference in time since the previous handover for that particular UE. This means that smaller the difference in time, higher the cost, and vice-versa. This cost function is added as a constraint to ensure that the cost does not exceed a pre-defined cost threshold.

Let $\beta_u$ is a weight associated with any $UE_u \in U$. $R_{u,t}$ is the throughput at any discrete window of time t, which depends on $c_{u,t}$, i.e., the PSCell assigned to u during t, and on RAN performance parameters $b_1, b_2, \ldots b_B$. These are available at the near-RT RIC (where the optimization is solved), thanks to E2SM-KPM/RC reports from the E2 nodes during the time window t. $C^{NR}$ is the universe of all the N' NR cells. The cost associated with handover for UE u at time t is given by $K_{u,t}$, the initial cost is $K_0$ (where $K_0 > 0$), the decay constant is $\delta$ (where $0 < \delta < 1$), $t'_u$ is the time when the previous handover was executed for u, $X_{u,t}$ is a 0/1 decision variable which yields a value 1, if u was subject to handover at time t, and 0, otherwise. W is a predefined cost threshold, which represents a maximum value that cannot be exceeded by the cost function. We consider any time window t for an infinite time horizon ranging from $t_0$ to $\infty$. The constrained optimization problem is formulated as follows:

$$\text{Maximize}_{c_{u,t} \in C^{NR}} \sum_{t=t_0}^{\infty} \sum_{u \in U} \beta_u \log R_{u,t}(c_{u,t}, b_1, b_2, \ldots b_B) \qquad (1)$$

$$\text{subject to } K_{u,t} \cdot X_{u,t} \le W,$$

$$X_{u,t} \in [0, 1],$$

where $K_{u,t} = K_0 e^{-\delta \cdot t - t'u}$, $K_0 > 0$ and $0 < \delta < 1$. Applying Lagrangian multiplier $\lambda$ to the constrained optimization problem in Equation (1), the constrained optimization problem becomes the following:

$$\text{Maximize}_{c_{u,t} \in C^{NR}} \sum_{t=t_0}^{\infty} \sum_{u \in U} \beta_u \log R_{u,t}(c_{u,t}, b_1, b_2, \ldots b_B) \qquad (2)$$

$$-K' e^{-\delta(t - t'_u)} X_{u,t} + W'$$

$$\text{subject to } \qquad X_{u,t} \in [0, 1] \text{ and } \lambda \ge 0$$

$$\text{where } K' = \lambda K_0 \text{ and } W' = \lambda W.$$

According to the present disclosure, we use a data-driven approach (specifically, RL) to model and learn $R_{u,t}$ as a function of $\{c_{u,t}, b_1, b_2, \ldots b_B\}$, due to the lack of a deterministic closed-form equation for $R_{u,t}$ as a function of the parameters, and its relationship with cost $K_{u,t}$ and the handover decision variable $X_{u,t}$. We consider the infinite time horizon MDP to model the system, where the EN-DC RAN (including the UEs) is the environment, and a single RL agent is deployed in the near-RT RIC containing the TS xApp. The system is modeled as an MDP because the TS xApp in the RIC controls the target PSCell for the UEs handover, while the resulting state (including the RAN performance parameters and the user throughput) is stochastic. The MDP is defined by the tuple $\langle S, A, P, R, \gamma, I \rangle$, each of which will be defined below.

S is the state space, comprising per-UE E2SM-KPM periodic data and per-UE E2SM-RC periodic/event-driven data. Let $C'_{u,t} \subseteq C^{NR}$ be the set of serving PSCell and neighboring cells for any UE u at time t. The state vector for u at time t from the environment ($\vec{S}_{u,t}$) includes the UE identifier for u and the set of parameters $b_1, b_2, \ldots b_B$, which set of parameters includes the following:

(i) the UE-specific L3 RRC measurements (obtained from the E2 node O-CU-CP), e.g., sin $r_{u,c,t}$ for any cell $c \in C'_{u,t}$ for the UE u;

(ii) $PRB_{c,t}$, the cell-specific Physical Resource Block (PRB) utilization for c at time t obtained from the E2 node O-DU;

(iii) $Z_{c,t}$, the cell-specific number of active UEs in the cell c with active Transmission Time Interval (TTI) transmission at t obtained from O-DU;

(iv) $P_{c,t}$, the total number of MAC-layer transport blocks transmitted by cell c across all UEs served by c at time t (obtained from the E2 node O-DU);

(v) $p_{c,t}^{QPSK}, p_{c,t}^{16QAM}, p_{c,t}^{64QAM}$, the cell-specific number of successful) transmitted transport blocks with QPSK, 16QAM and 64QAM modulation rates from the cell c to all UEs served by the c at time t normalized by $P_{c,t}$; and (vi) the cost the UE u would incur, if handed over to $c_{u,t}$ at t (i.e., where $c_{u,t} \neq c_{u,t-1}$), which cost is represented by:

$$k(c_{u,t}) = K_0 e^{-\delta(t-t_u')} x(c_{u,t}); \text{ where } x(c_{u,t}) = \begin{cases} 1 & \text{if } c_{u,t} \neq c_{u,t-1} \\ 0 & \text{otherwise} \end{cases}$$

Note that the cost $k(c_{u,t})$ is zero if there is no handover, i.e., $c_{u,t} = c_{u,t-1}$.

The above-listed state information items are aggregated across all the serving and neighboring cells of u, i.e., $\forall c \in C'_{u,t} \subseteq C^{NR}$, along with the cell identifier for c, during the reporting window t to generate a consolidated record for u for t. This aggregated state information for u is fed as input feature to the RL agent on the TS xApp. This is done for all UEs in U, whose aggregated state information is fed to the same RL agent. If any of the parameters in the state information from the environment for any UE u is missing, the RIC ETL service uses a configurable small window $\in$ to look back into recent history (e.g., tens to hundreds of ms) and fetch those historical parameters for the missing ones.

A is the action space, represented by the following expression:

$$A = \{HO(c_1), HO(c_2), \ldots HO(c_{N'}), \overline{HO}\}$$

where, $c1, c2, \ldots c_{N'} \in C^{NR}$. Here, $a_{u,t} = HO(c)$, where $a_{u,t} \in A$, indicates that the RL agent is recommending a handover action for u to any cell c at t, and $a_{u,t} = \overline{HO}$ indicates no handover action for u at t, meaning that the UE shall continue being served by its current primary serving cell.

$P(\vec{S}_{u,t+1} | \vec{S}_{u,t}, a_{u,t})$ is the state transition probability of UE u from state $\vec{S}_{u,t}$ at t to $\vec{S}_{u,t+a}$ at t+1 caused by action $a_{u,t} \in A$.

$R: S \times A \rightarrow \mathbb{R}$ is the reward function for UE u at t+1, as a result of action $a_{u,t}$, given by the following expression (3):

$$R_{u,t+1} = \beta_u \cdot (\log R_{u,t+1}(c_{u,t+1}) - \log R_{u,t}(c_{u,t})) - k(c_{u,t+1}) \quad (3)$$

The reward for UE u is the improvement in the logarithmic throughput $R_{u,t}$ due to the transition from $\vec{S}_{u,t}$ to $\vec{S}_{u,t+1}$ caused by action $a_{u,t}$ taken at t, minus the cost factor. The reward is positive, if the improvement in log throughput is higher than the cost, and negative, otherwise. $R_{u,t}$ is obtained from O-CU-UP using E2SM-KPM.

$\gamma \in [0, 1]$ is the discount factor for future rewards. The value function $V^\pi(s)$ is the net return given by the expected cumulative discounted sum reward from step t onwards due to policy $\pi$, which value function is represented as follows:

$$V^\pi | (s) = \mathbb{E}\left[\sum_{u \in U} \sum_{i=0}^{\infty} \gamma^i R_{u,t+l} \,\middle|\, \vec{s}_{u,t} = s, \pi(a|s)\right] \quad (4)$$

I is the initial distribution of the UE states.

According to the present disclosure, we consider two policies: (i) a target policy $\pi(a|s)$, to learn the optimal handover action a for any state $s = \vec{S}_{u,t}$; and (ii) a behavior policy $\mu(a|s)$, to generate the handover actions which result in state transition and a new state data from the environment. In connection with these policies, we utilize Q-learning, a model-free, off-policy, value-based RL approach. We compute the Q function, an action-value function which measures the expected discounted reward upon taking any action a on any given state s based on any policy $\pi$. The value returned by the Q-function is referred to as the Q-value, i.e., $$Q^\pi(s, a) = \mathbb{E}\left[\sum_{u \in U} \sum_{i=0}^{\infty} \gamma^i R_{u,t+i} \,\middle|\, \vec{s}_{u,t} = s, a_{u,t} = a, \pi(a|s)\right] \quad (5)$$

$$= r(s, a) + \gamma \mathbb{B}_{\mathcal{P}(s'|s,a)}[Q^\pi(s', a') | s, a, \pi]$$

where $$r(s, a) = \mathbb{B}\left[\sum_{u \in U} R_u \,\middle|\, \vec{s}_{u,t} = s, a_{u,t} = a, \pi(a|s)\right].$$

From equations (4) and (5), we derive the following:

$$V^\pi(s) = \sum_a \pi(a|s) Q^\pi(s, a). \quad (6)$$

The optimal policy $\pi^\star$ is the one that maximizes the expected discounted return, and the optimal Q function $Q^\star$ (s, a) is the action-value function for $\pi^\star$ given by the Bellman equation as follows:

$$\pi^\star(a|s) = \operatorname*{argmax}_\pi Q^\pi(s, a) \quad (7)$$

$$Q^\star(s, a) = r(s, a) + \gamma \mathbb{E}_{\mathcal{P}(s'|s,a)}\left[\max_{a'} Q^\star(s', a') \,\middle|\, \vec{s}_{u,t} = s, a_{u,t} = a, \pi^\star\right]$$

According to an example embodiment of the present disclosure, we use the Q-learning algorithm to iteratively update the Q-values for each state-action pair using the Bellman equation (equation (8) shown below), until the Q function converges to $Q^\star$ This process is called value iteration, and is used to determine the optimal policy $\pi^\star$ that maximizes the Q-function, yielding $Q^\star$. Value iteration by the RL agent leverages the exploration-exploitation trade-off to update the target policy $\pi$. Value iteration explores the state space of the environment by taking random handover control actions and learning the Q-function for the resulting state-action pair, and exploits its learning to choose the optimal control action maximizing the Q-value, i.e., $$Q_{i+1}^\pi(s, a) = r(s, a) + \gamma \mathbb{E}\left[\max_{a'} Q_i^\pi(s', a' | s, a, \pi)\right]. \quad (8)$$

Such value iteration algorithms converge to the optimal action-value function, i.e., $$Q^\star := \lim_{i \to \infty} Q_i^\pi.$$

The Bellman error $\Delta$, which is represented below in equation (9), is the update to the expected return of state s, when we observe the next state s'. Q-learning repeatedly adjusts the Q-function to minimize the Bellman error, shown below:

$$\Delta_{i+1} = \left[r(s, a) + \gamma \max_{a'} Q_i^\pi(s', a')\right] - Q_{i+1}^\pi(s, a) \quad (9)$$

$$Q_{i+1}^\pi(s, a) \leftarrow (1 - \omega) Q_{i+1}^\pi(s, a) + \omega\left[r(s, a) + \gamma \max_{a'} Q_i^\pi(s', a')\right].$$

Figure 4:
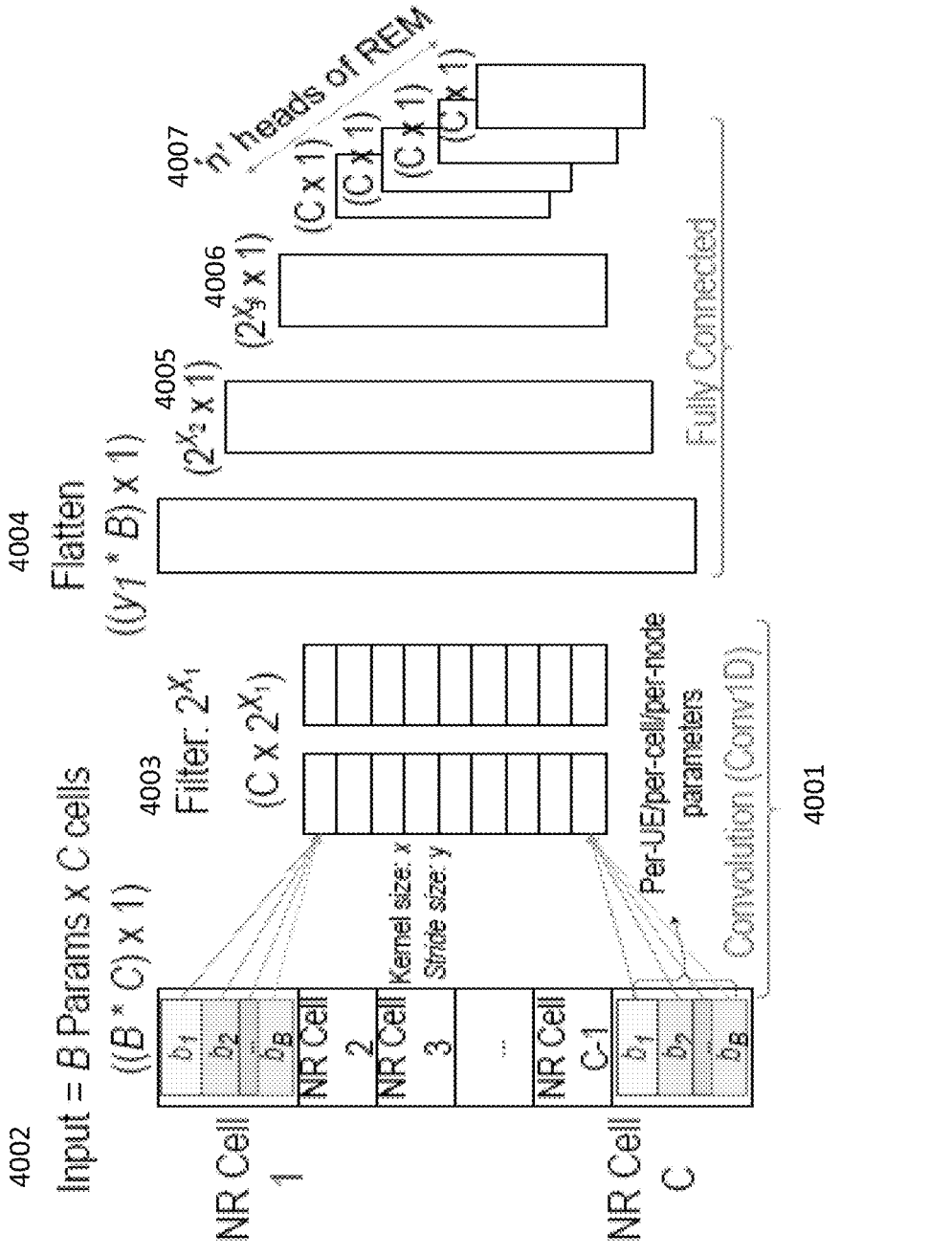
FIG. 4 is a diagram illustrating an example embodiment of the CNN architecture according to the present disclosure.

This approach of $$\lim_{i \to \infty} Q_i^\pi \to Q^\star$$

has practical constraints, and to address this, we use a CNN approximator with weights $\theta$ to estimate the Q function Q(s, a; $\theta$), and refer to it as the Q-network. An example embodiment of the CNN architecture according to the present disclosure is shown in FIG. 4. The CNN architecture will be discussed in detail later, in connection with data collection and agent training.

Deep Q-learning comes from parameterizing Q-values using CNNs. Therefore, instead of learning a table of Q-values, the example method learns the weights of the CNN $\theta$ that outputs the Q-value for every given state-action pair. The Q-network is trained by minimizing a sequence of loss functions $L_i(\theta_i, \pi)$ for each iteration i. The optimal Q-value, as a result of CNN approximator, is represented by $\overline{Q}^\star$ as shown below in equation (10):

$$L_i(\theta_i, \pi) = \mathbb{E}\left[\left(r(s, a) + \gamma \max_{a'} Q^\pi(s', a'; \theta_{i-1}) - Q^\pi(s, a; \theta_i)\right)^2 \Big| s, a, \pi\right] \quad (10)$$

$$\overline{Q}_i^\pi = \operatorname*{argmin}_{Q^\pi}\{E[Q^\pi(s, a, \theta_i) \mid s, a, \pi(a \mid s)] + \omega L_i(\theta_i, \pi)\}$$

$$\overline{Q}^\star := \lim_{i \to \infty} \overline{Q}_i^\pi$$

where $$\mathbb{E}_{\mathcal{P}(s' \mid s, a)}\left[r(s, a) + \gamma \max_{a'} Q^\pi(s', a'; \theta_{i-1}) \Big| s, a, \pi\right].$$

is the target for iteration i. The parameters from the previous iteration $\theta_{i-1}$ are fixed for optimizing the loss function $L_i(\theta_i)$. The gradient of the loss function is obtained by differentiating the loss function in Equation (10) with respect to $\theta$, and the loss can be minimized by computing its stochastic gradient descent.

According to an example embodiment of the present disclosure, an off-policy Q-learning algorithm, called DQN, is used for this purpose. The DQN algorithm leverages an experience replay buffer, where the RL agent's experiences at each step $e_t = (s_t, a_t, r_t, s_{t+1})$ are collected using the behavior policy $\mu$ and stored in a replay buffer D={$e_1 e_2$, . . . $e_{t-1}$} for the policy iterate $\pi_i$. D is pooled over many episodes, composed of samples from policy iterates $\pi_0, \pi_1, \ldots \pi_i$, so as to train the new policy iterate $$\pi_{i+1}\left(\text{as } Q^\star = \lim_{i \to \infty} Q_i^\pi \lim\right).$$

At each time step of data collection, the transitions are added to a circular replay buffer. To compute the loss $L_i(\theta_i)$ and the gradient, we use a mini-batch of transitions sampled from the replay buffer, instead of using the latest transition to compute the loss and its gradient. Using an experience replay has advantages in terms of an off-policy approach, better data efficiency from re-using transitions and better stability from uncorrelated transitions.

To leverage the full potential of the integrated ns-3 simulation environment in ns-O-RAN and harness large datasets generated from the simulator via offline data collection for data-driven RL, an example method according to the present disclosure utilizes offline Q-learning (Q-learning is a type of RL). This enables learning the Convolutional Neural Network (CNN) weights by training the Q-network using the Deep-Q Network (DQN) model from dataset D collected offline based on any behavior policy (potentially unknown, using any handover algorithm) $\pi$ without online interactions with the environment, and hence no additional exploration by the agent is necessary beyond the experiences $e_t$ available in D via $\mu$. The trained model is then deployed online to interact with the environment, and the Q-function is iteratively updated online.

According to an example embodiment, a robust offline Q-learning variant of the DQN algorithm is utilized, called Random Ensemble Mixture (REM), which enforces optimal Bellman consistency on J random convex combinations of multiple Q-value estimates to approximate the optimal Q-function. This approximator is defined by mixing probabilities on a (J−1) simplex and is trained against its corresponding target to minimize the Bellman error, as represented below in equation (11).

$$\hat{L}_i(\theta_i, \pi) = \mathbb{E}\left[\left(r(s, a) + \gamma \max_{a'} \hat{Q}^\pi(s', a'; \theta_{i-1}) - \right.\right. \quad (11)$$
$$\left.\left. \hat{Q}^\pi(s, a; \theta_i)\right)^2 \Big| s, a, \pi\right]$$
$$= \mathbb{E}[(r(s, a) + \gamma \max_{a'} \sum_j \alpha_j Q_j^\pi(s', a'; \theta_{i-1})$$
$$- \sum_j \alpha_j Q_j^\pi(s', a'; \theta_{i-1}))^2 \mid s, a, \pi]$$

$$\hat{Q}_i^\pi = \operatorname*{argmin}_{Q^\pi} \hat{L}_i(\theta_i, \pi)$$

Here, $\alpha_j \in \mathbb{R}^J$, such that $$\sum_{j=1}^{J} \alpha_j = 1 \text{ and } \alpha_j \geq 0, \forall j \in [i, J].$$

$\alpha j$ represents the probability distribution over the standard (J−1)-simplex. While REM prevents the effect of outliers and can effectively address imbalances in the offline dataset D, offline-Q learning algorithms suffer from action distribution shift caused by bias towards out-of-distribution actions with over-estimated Q values. This is because the Q-value iteration in Bellman equation uses actions from target policy $\pi$ being learned, while the Q-function is trained on action-value pair generated from D generated using behavior policy $\mu$. To avoid this problem of over-estimation of Q-values for out-of-distribution actions, an example embodiment of the present disclosure utilizes a conservative variant of offline DQN, called Conservative O-learning (CQL), that learns a conservative, lower-bound Q-function by (i) minimizing Q-values computed using REM under the target policy distribution $\pi$, and (ii) introducing a Q-value maximization term under the behavior policy distribution $\mu$. From Equation (10), the iterative update for training the Q-function using CQL and REM can be represented as follows:

$$\hat{Q}_i^\pi \leftarrow \operatorname*{argmin}_{Q^\pi} \underbrace{\{\mathbb{E}\left[\hat{Q}^\pi(s, a_\pi; \theta_i) \mid s, a_\pi, \pi(a_\pi \mid s)\right]}_{\text{minimize REM Q-value under } \pi} - \quad (12)$$

-continued $$\mathbb{E}\underbrace{\left[\hat{Q}(s, a_\mu; \theta_i)\,\middle|\,s, a_\mu, \mu(a_\mu\,|\,s)\right]}_{\text{maximize REM } \hat{Q}\text{-value under }\mu} + \omega\hat{L}_i(\theta_i, \pi)\}$$

$$\hat{Q}^\star := \lim_{i \to \infty} \hat{Q}_i^\pi$$

Here, $\hat{L}_i(\theta_i, \pi)$ and $\hat{Q}^\pi(s, a; \theta_i)$ are as defined in Equation (11).

An example sequence of steps for offline Q-learning training method (Algorithm 1) is summarized below.

---

1:      Store offline data (generated from ns-3) using any handover
algorithm and behavior policy μ into replay buffer D consisting of
UE-specific records ($\forall u \in U$)
2:          while D not empty and value iteration i
3:              Begin training step:
4:                  Select a batch of $2^{x1}$ samples for input to the CNN
5:                  Use the Q-function and loss function $\hat{L}$ from Equation
                    (12) to train the CNN weights $\theta_i$ based on CQL and
                    REM for value iteration i of target policy π for $\check{Q}_i^\pi$
6:              Set $i \leftarrow i + 1$
7:          end while

---

After the offline Q-learning training (Algorithm 1) has been completed, the Q-learning algorithm is deployed in the TS xApp for online value iteration, inference and control method (Algorithm 2), which is summarized below.

---

1: while Incoming experience data $e_t$ for any UE u from RAN
environment to near-RT RIC for $t \in [t_0, \infty]$
2:      Append $e_t$ to replay buffer $D' \subseteq D$ in AI/ML training services with
        length $D' \leq D$
3:      Begin inference step:
4:          Repeat steps 4 and 5 from Algorithm 1
5:          Generate HO control action for u from the TS xApp over
            E2 to RAN environment based on $\check{Q}_i^\pi$
6:      Set $i \leftarrow i + 1$
7:  end while

---

Described in the following sections are the simulation scenario, the baseline handover modes considered for the comparison, the metrics of interest, and the results based on a large scale evaluation in different deployment scenarios.

For simulation scenario, a dense urban deployment is modeled, with N=1 O-eNBs and M=7 gNBs. One of the gNBs is co-located with the O-eNB at the center of the scenario, the others provide coverage in an hexagonal grid. Each node has an independent E2 termination, with reporting periodicity set to 100 ms. In an example embodiment, two configurations are studied: (i) low band with center frequency 850 MHz and inter-site distance between the gNBs of 1700 m; and (ii) C-band, with center frequency of 3.5 GHz and inter-site distance of 1000 m. In each configuration, the bandwidth is 10 MHz for the O-eNB and 20 MHz for the gNBs. The channel is modeled as a 3GPP Urban Macro (UMa) channel. The 3GPP NR gNBs use numerology 2. $N_{UE}=|U|$ dual-connected UEs are randomly dropped in each simulation run with a uniform distribution, and move according to a random walk process with minimum speed $S_{min}=2.0$ m/s and maximum speed $S_{max}=4.0$ m/s.

In terms of traffic models according to example embodiments of the present disclosure, it is provided that the users request downlink traffic from a remote server with a mixture of four traffic models, each assigned to 25% of the UEs, i.e., the traffic models include: (i) full buffer Maximum Bit Rate (MBR) traffic, which saturates at $R_{fb,max}=20$ Mbit/s, to simulate file transfer or synchronization with cloud services;

(ii) bursty traffic with an average data rate of $R_{b,max}=3$ Mbit/s, to model video streaming applications; and (iii) two bursty traffic models with an average data rate of 750 Kbit/s and 150 Kbit/s, for web browsing, instant messaging applications, and Guaranteed Bit Rate (GBR) traffic (e.g., phone calls). The two bursty traffic models feature on and off phases with a random exponential duration.

In terms of baseline handover strategies according to example embodiments of the present disclosure, three baseline handover models are considered (and/or utilized) for training the AI agent and for evaluating its effectiveness. The three models, which represent different strategies used for handovers in cellular networks, include: RAN RRM heuristic; SON1; and SON2. RAN RRM heuristic decides to perform a handover if a target cell has a channel quality metric (e.g., in this case, the SINR) above a threshold (e.g., 3 dB) with respect to the current cell. The SON1 and SON2 algorithms use more advanced heuristics, based on a combination of a threshold and a Time-to-Trigger (TTT). The SON1 algorithm assumes a fixed TTT, i.e., the handover is triggered only if the target cell SINR is above a threshold (e.g., 3 dB) for a fixed amount of time (e.g., 110 ms). The SON2 algorithm uses a dynamic TTT, which is decreased proportionally to the difference between the target and current cell SINR.

For the performance evaluation of the TS xApp, we utilize the metrics related to throughput, channel quality, spectral efficiency, and mobility overhead. For the throughput, we report the average UE throughput at the Packet Data Convergence Protocol (PDCP) layer, i.e., including both LTE and NR split bearers, as well as the 10th and 95th percentiles (of all the users in a simulation, averaged over multiple independent runs). The channel quality is represented by the SINR. For the spectral efficiency, we analyze the average value for each UEs and cell, as well as the 10th percentile, and the percentage of PRBs used for downlink traffic. Finally, we evaluate the UE mobility overhead $H_u$ as the number of handovers per unit time weighted by a throughput factor $$\tilde{R}_u = \mathbb{E}(R_u)/\Sigma_{u' \in U}\,\mathbb{E}(R'_u),$$

where $\mathbb{E}(R_u)$ is the average throughput for the user over the same unit time.

Data collection and agent training are discussed in this section. The data collection is based on a total of more than 2000 simulations for the different configurations, including multiple independent simulation runs for each scenario. Table 1 provides the list of RL hyperparameters (a hyperparameter is a parameter whose value is used to control the learning process) and their values considered according to an example embodiment in the present disclosure.

TABLE 1

| RL hyperparmeters and their value | |
|---|---|
| Hyperparameters | Value |
| IDQN Agent (Offline) | |
| Target update period | 8000 |
| Batch size | 32 |
| Number of heads (n heads in FIG. 4) | 200 |
| Number of actions (N in FIG. 4)) | 7 |
| Minimum replay history | 20000 |
| Terminal (Episode) length | 1 |
| Gamma | 0.99 |

TABLE 1-continued

RL hyperparmeters and their value

| Hyperparameters | Value |
| --- | --- |
| Replay capacity | 1000000 |
| Number of iterations | 400 |
| Training steps | 100000 |
| Optimizer | |
| Optimizer | AdamOptimizer |
| Learning rate | 0.00005 |
| NN (FIG. 4) | |
| Conv1D Layer | filters = 32, kernel size = 8 |
| | strides = 8, activation = ReLu |
| Flatten Layer | 225 neurons |
| Dense Layer 1 | 128 neurons |
| Dense Layer 2 | 32 neurons |
| Dense Layer 3 | 1400 neurons |

In the offline training, frequency with which the target network gets updated is set to 8000 training steps. In an example embodiment, 400 iterations are performed during the offline training, and each iteration has 100,000 training steps, for a total of 40 million training steps. In a training step, a batch of 32 samples (or data points) are selected randomly for input to Neural Network (NN), e.g., the CNN architecture shown in FIG. 4.

Figure 5:
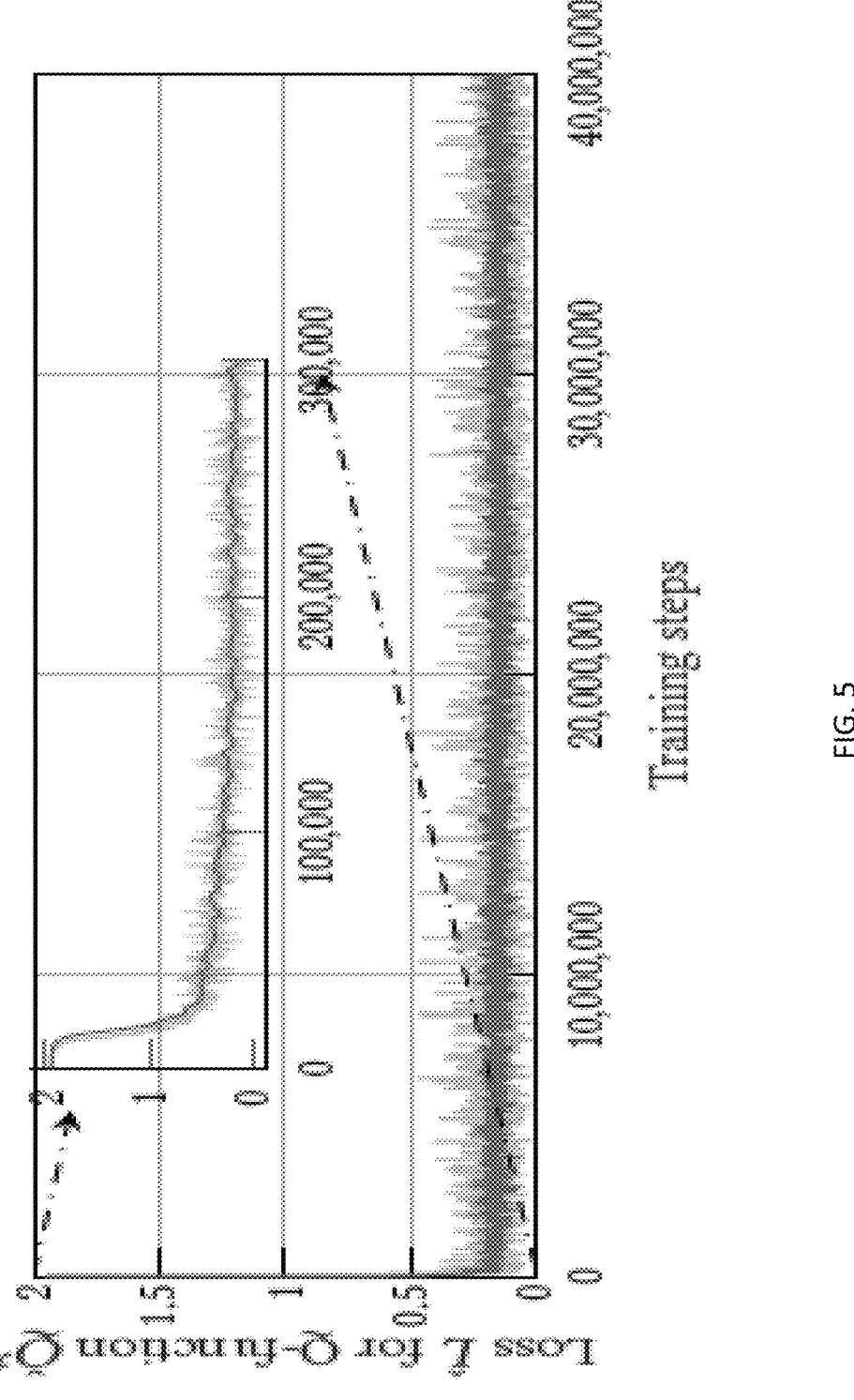
FIG. 5 is a graph illustrating the trend of the loss $\hat{L}$ for the Q-function $\hat{Q}^\pi$ during the training of the RL agent

The CNN architecture shown in FIG. 4 includes a convolution layer 4001 (labeled "Conv1D") performing convolution (e.g., in this example, a 1D convolution in which the CNN kernel moves in one direction) on the input 4002 (which includes B number of parameters (representing per-UE/per-cell/per-node parameters)×C number of cells) using filter(s) 4003. According to an example embodiment, the Conv1D layer 4001 performs convolution with $2^x{}_1$=32 filters. According to an example embodiment, the kernel size (x) and stride (y) are set to 8, as each cell has 8 input parameters, and activation function is ReLU. A "kernel" is a matrix of weights which are multiplied with the input to extract relevant features. "Stride" is a parameter of the filter 4003 that modifies the amount of movement over the data set, e.g., if a neural network's stride is set to 1, the filter will move one unit at a time. The flattening layer 4004 (with $y_1B$=225) involves taking the pooled feature map that is generated (e.g., in a pooling step, which is not explicitly shown, after the convolution layer 4001) and transforming it into one-dimensional vectors. Third layer 4005, fourth layer 4006, and fifth layer 4007 are fully connected layers (where each input is connected to all neurons), with $2^x{}_2$=128 for third layer 4005, $2^x{}_3$=32 for the fourth layer, and 1400 units/neurons for the fifth layer 4007. The number of units in the fifth layer 4007 layer is given by the product of n=200 (the number of heads of the REM) and the number of actions N=7. We use the Adam optimizer with a learning rate of 0.00005. FIG. 5 shows the trend of the loss L for the Q-function $\hat{Q}^\pi$ during the training of the RL agent, including a focus on the first $3\cdot10^5$ iterations. The initial cost $K_0$ from Equation (1) is 1, and δ (decay constant) is 0.1.

In this section, we discuss the results obtained after the training and the online testing of the xApp as described above. The RL agent was tested in simulations with the baselines Handovers (HOs) disabled. The experiments were repeated with different numbers of UEs, and averaged around 600,000 records for Frequency Range 1 (FR1) 850 MHz and around 300,000 records for FR1 C-band in online evaluation. FIG. 6a shows the average UE throughput for the 850 MHz deployment, while FIG. 6b illustrates the Cumulative Distribution Function (CDF) of the SINR with 126 UEs. The RIC RL introduces an improvement of the average throughput (averaging around 50%) and SINR with respect to the baselines, meaning that the RL agent is able to customize the HO-control for each single UE. This trend is also confirmed as the number of UEs increases, proving the scalability of this approach over baselines. The customization of the mobility for a single UE is one of the advantages of using the xApps ecosystem, which has a centralized and abstracted view of the network status.

Figures 7A, 7B, 7C, 7D:
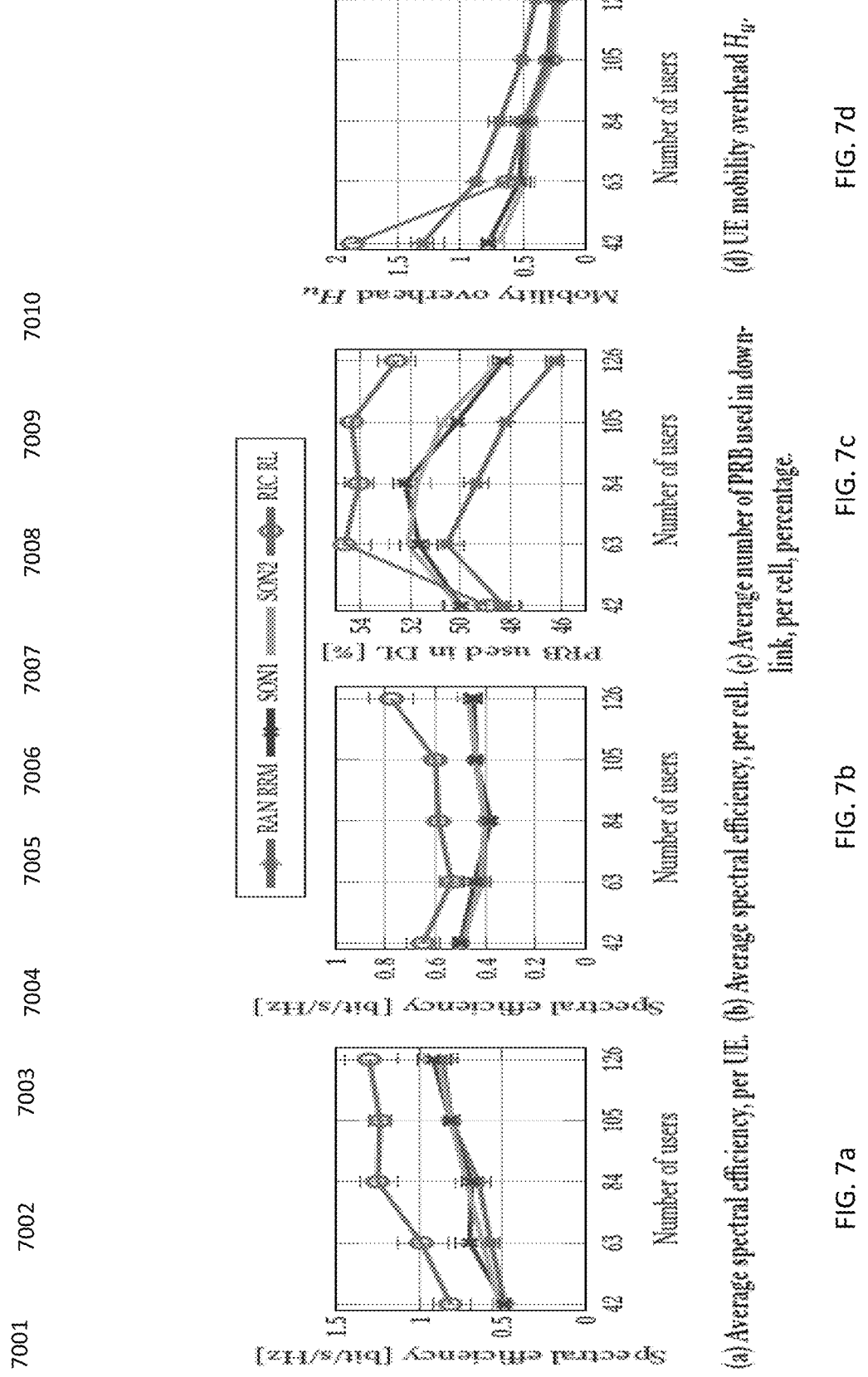
FIG. 7a illustrates average spectral efficiency, per UE.
FIG. 7b illustrates average spectral efficiency, per cell.
FIG. 7c illustrates average number of PRB used in downlink, per cell, percentage.
FIG. 7d illustrates UE mobility overhead $H_u$.

Moreover, by looking at the percentiles of the user throughput, it can be seen that our RL agent brings consistent improvement not only on the average UEs, but also between the worst users ($10^{th}$ percentile user throughput, FIG. 6c), showing 30% improvements, and best users ($95^{th}$ percentile user throughput, FIG. 6d), showing around 60% improvement. The 126 UEs result is particularly relevant, as also evidenced by the improvement in SINR shown in FIG. 6b. Contrary to heuristic-based HOs, the RL algorithm leverages UE-level and cell-level KPMs to make the decision to centrally handover/steer the user to an optimal NR neighbor, in terms of load and SINR. This results in an improved spectral efficiency (and thus throughput), as shown in FIGS. 7a and 7b, demonstrating 52% and 35% improvements, respectively. The same holds for the PRB utilization (FIG. 7c). Indeed, since RIC RL utilizes cell-level KPMs at 100 ms granularity, it is able to handover UEs to a target cell with higher residual PRBs.

The above-listed improvements in the throughput could, however, eventually come with a major cost in terms of HO management, and thus energy expenditure. The mobility overhead $H_u$ of FIG. 7d clearly shows that the RL agent is not causing more HOs, but instead follows the trend of the baselines, while at the same time delivering better throughput. The only exception is for 42 UEs, where the RL agent triggers more HOs than all baselines. One of the possible reasons can be identified in the cost function previously described in Equation (2), where the reward (logarithmic throughput gain, which is higher with fewer users) compensates for the cost of handover, thereby resulting in an increase in mobility overhead $H_u$.

Figure 8:
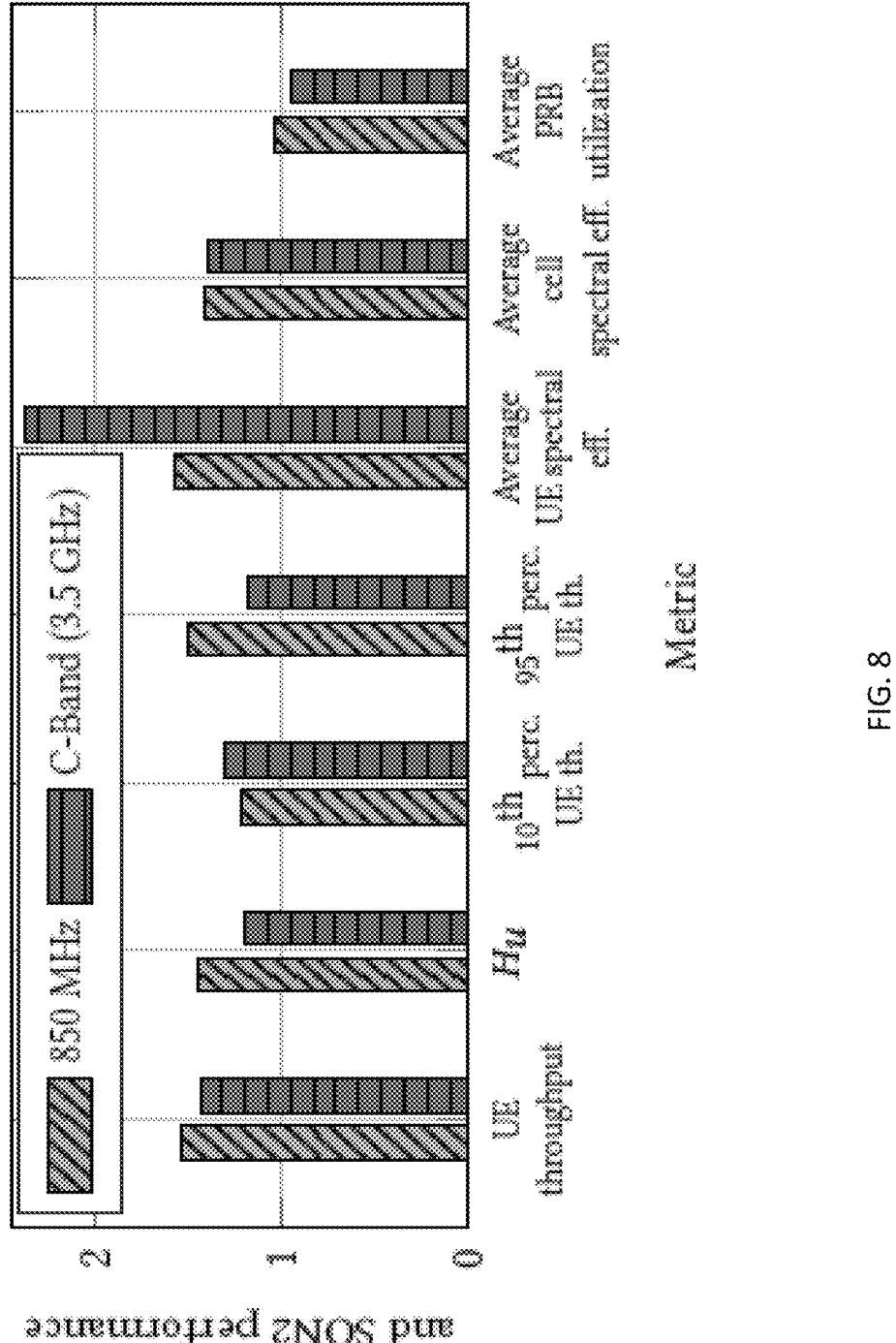
FIG. 8 illustrates a comparison between the performance gain in the 850 MHz band and in the 3.5 GHz band (or C-Band).

FIG. 8 shows a comparison of the previously discussed results for 850 MHz with the C-Band deployment. FIG. 8 shows the relative gains of the performances of the RL agent in the two bands. The gain of each KPM shown in the x-axis is defined as the ratio between the performance with the RIC RL and SON2 for the corresponding metric. Given this definition, the RL agent is performing better than the baseline when the ratio is greater than 1. The analysis of the relative gains shows that while the average PRB utilization of the RIC falls below the baseline, the other KPMs improve consistently, showing the adaptability of RIC RL through different bands.

In summary, the present disclosure provides a complete, system-level, O-RAN-compliant framework for the optimization of TS in 3GPP networks. More specifically, the present disclosure provides a method of throughput maximization through the selection of the NR serving cell in an EN-DC setup. A cloud-native near-RT RIC is implemented, which is connected through open, O-RAN interfaces to a simulated RAN environment in ns-3. In addition, the present disclosure provides a custom xApp for the near-RT RIC, with a data-driven handover control based on REM and CQL. Finally, the performance of the agent on a large scale deployment in multiple frequency bands is profiled, evaluating its gain over traditional handover heuristics.

The invention claimed is:

1. A method of optimizing traffic steering (TS) radio resource management (RRM) decisions for handover of at least one user equipment (UE) in Open Radio Access Network (O-RAN), comprising:

providing an O-RAN-compliant near real time RAN intelligent controller (near-RT RIC) configured to interact with O-RAN nodes; and utilizing an artificial intelligence (AI)-based TS application in the near-RT RIC to optimize TS handover control and maximize UE throughput utility, wherein a data-driven AI-powered TS xApp in the near-RT RIC is utilized to optimize the TS handover control, and wherein the TS xApp is configured utilizing a virtualized and simulated environment for O-RAN.

2. The method according to claim 1, wherein the virtualized and simulated environment for O-RAN is provided by ns-O-RAN platform.

3. The method according to claim 2, wherein the optimization problem to be solved is formulated as a Markov Decision Process (MDP).

4. The method according to claim 3, wherein a solution to the optimization problem is derived by using at least one reinforcement learning (RL) technique.

5. The method according to claim 4, wherein the RL technique is utilized to select an optimal target cell for TS handover of the UE.

6. The method according to claim 5, wherein the RL technique is based on at least a Deep Q-Network (DQN) algorithm.

7. The method according to claim 6, wherein the DQN algorithm includes at least one of Conservative Q-learning (CQL) algorithm and Random Ensemble Mixture (REM) algorithm.

8. The method according to claim 7, wherein the RL technique is additionally based on Convolutional Neural Network (CNN) architecture.

9. The method according to claim 8, wherein the at least one of the CQL algorithm and the REM algorithm is used in conjunction with the CNN architecture to model a Q-function and the loss function.

10. The method of claim 9, wherein an offline Q-learning training is performed using the CQL algorithm, and the trained CQL algorithm is deployed in the TS xApp for at least one of online value iteration, inference derivation and handover control.

11. The method according to claim 8, wherein the RL technique enables control of multiple UEs using a single RL agent.

12. The method according to claim 8, wherein an offline Q-learning training is performed using the CQL algorithm, and the trained CQL algorithm is deployed in the TS xApp for at least one of online value iteration, inference derivation and handover control.

13. The method according to claim 7, wherein an offline Q-learning training is performed using the CQL algorithm, and the trained CQL algorithm is deployed in the TS xApp for at least one of online value iteration, inference derivation and handover control.

14. The method according to claim 4, wherein the Near-RT RIC with a TS xApp is integrated with a simulated environment on ns-3 for data collection and testing of at least one RL-based control policy.

15. The method according to claim 2, wherein the Near-RT RIC with a TS xApp is integrated with a simulated environment on ns-3.

16. The method according to claim 2, wherein the TS xApp in the near-RT RIC is evaluated for Key Performance Indicators (KPIs) including at least one of UE throughput, spectral efficiency, and mobility overhead.

17. The method according to claim 16, wherein the evaluation of the TS xApp for KPIs is performed on a simulated RAN network generated by an ns-O-RAN platform.

18. The method according to claim 17, wherein the ns-O-RAN platform includes a combination of ns-3 5G RAN module and an O-RAN-compliant E2 implementation.

* * * * *